(12) United States Patent
Bowe

(10) Patent No.: US 7,235,218 B2
(45) Date of Patent: *Jun. 26, 2007

(54) CATALYTIC REACTORS

(75) Inventor: Michael Joseph Bowe, Preston (GB)

(73) Assignee: Compactgtl PLC, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 11/105,371

(22) Filed: Apr. 14, 2005

(65) Prior Publication Data
US 2005/0234138 A1    Oct. 20, 2005

(30) Foreign Application Priority Data
Apr. 20, 2004    (GB)    ................. 0408896.9

(51) Int. Cl.
B01J 8/02    (2006.01)
C10L 3/00    (2006.01)

(52) U.S. Cl. .............. 422/211; 422/222; 422/190; 48/127.7; 48/127.9; 48/127.5

(58) Field of Classification Search .............. 422/211, 422/222, 190, 177, 174; 518/704; 48/127.7, 48/127.9, 127.5
See application file for complete search history.

(56) References Cited

U.S. PATENT DOCUMENTS

| | | | |
|---|---|---|---|
| 1,662,870 A | | 3/1928 | Stancliffe |
| 2,959,401 A | | 11/1960 | Burton |
| 3,528,783 A | | 9/1970 | Haselden |
| 4,623,019 A | | 11/1986 | Wiard |
| 5,328,359 A | * | 7/1994 | Retallick ............. 431/326 |
| 5,342,588 A | * | 8/1994 | Humpolik ............ 422/311 |
| 5,672,629 A | * | 9/1997 | Heil et al. ............ 518/704 |
| 6,180,846 B1 | | 1/2001 | Dandekar |
| 6,558,634 B1 | | 5/2003 | Wang |
| 6,616,909 B1 | | 9/2003 | Tonkovich |
| 6,851,171 B2 | | 2/2005 | Schmitt |
| 6,969,505 B2 | | 11/2005 | Tonkovich |

(Continued)

FOREIGN PATENT DOCUMENTS

DE    3926466    2/1991

(Continued)

OTHER PUBLICATIONS

Partial English translation of DE 39 26 466.

Primary Examiner—N. Bhat
(74) Attorney, Agent, or Firm—William H. Holt

(57) ABSTRACT

A compact catalytic reactor comprises a stack of plates (72, 74, 75) to define a multiplicity of first and second flow channels arranged alternately in the stack; each flow channel in which a chemical reaction is to take place is defined by straight-through channels across at least one plate, each such straight-through channel containing a removable gas-permeable catalyst structure (80) incorporating a metal substrate. The first flow channels (76) are oriented in a direction that is perpendicular to that of the second flow channels (77), and between successive second flow channels in the stack the reactor defines at least three side-by-side first flow channels (76); and the reactor incorporates flow diversion means (80; 88) such that the first fluid must flow through at least three such first flow channels (76) in succession, in flowing from an inlet to an outlet. The overall flow paths can therefore be approximately co-current or counter-current.

9 Claims, 3 Drawing Sheets

U.S. PATENT DOCUMENTS

| | | | |
|---|---|---|---|
| 2003/0105172 A1* | 6/2003 | Bowe et al. | 518/728 |
| 2004/0237303 A1* | 12/2004 | Maude | 29/890 |
| 2005/0013769 A1* | 1/2005 | Bowe et al. | 423/652 |
| 2005/0048332 A1 | 3/2005 | Pettit | |
| 2005/0048333 A1 | 3/2005 | Pettit | |
| 2005/0176832 A1 | 8/2005 | Tonkovich | |
| 2005/0234138 A1* | 10/2005 | Bowe | 518/726 |
| 2006/0002848 A1 | 1/2006 | Tonkovich | |

FOREIGN PATENT DOCUMENTS

| | | | |
|---|---|---|---|
| DE | 10147368 | | 4/2002 |
| EP | 0212878 | | 3/1987 |
| EP | 0885653 | * | 6/1988 |
| EP | 0 571 056 | * | 5/1993 |
| EP | 0 724 069 | * | 7/1996 |
| GB | 1 531 134 | * | 11/1978 |
| GB | 1 546 097 | * | 5/1979 |
| WO | 01/51194 | | 7/2001 |
| WO | 0151194 | | 7/2001 |
| WO | WO 01/51194 | * | 7/2001 |
| WO | 02051538 | | 7/2002 |
| WO | 03006149 | | 1/2003 |
| WO | WO 03/0333132 | * | 4/2003 |
| WO | 03/048034 | | 6/2003 |

* cited by examiner

CATALYTIC REACTORS

This invention relates to a catalytic reactor suitable for use in a chemical process to convert natural gas to longer-chain hydrocarbons, and to a plant including such catalytic reactors to perform the process.

A process is described in WO 01/51194 and WO 03/048034 (Accentus plc) in which methane is reacted with steam, to generate carbon monoxide and hydrogen in a first catalytic reactor; the resulting gas mixture is then used to perform Fischer-Tropsch synthesis in a second catalytic reactor. The overall result is to convert methane to hydrocarbons of higher molecular weight, which are usually liquids or waxes under ambient conditions. The two stages of the process, steam/methane reforming and Fischer-Tropsch synthesis, require different catalysts, and catalytic reactors are described for each stage. The catalytic reactors enable heat to be transferred to or from the reacting gases, respectively, as the reactions are respectively endothermic and exothermic. The reactors for the two different stages must comply with somewhat different requirements: Fischer-Tropsch synthesis is usually carried out at a higher pressure but a lower temperature than steam/methane reforming; and in the heat transfer channels of the Fischer-Tropsch reactor only a coolant fluid is required, whereas the heat required for steam/methane reforming would typically be provided by combustion, and so would require a suitable catalyst.

According to the present invention there is provided a compact catalytic reactor comprising a plurality of metal sheets arranged as a stack and bonded together, the stack defining a plurality of first flow channels for a first fluid alternating in the stack with a plurality of second flow channels for a second fluid so as to ensure good thermal contact between the first and the second fluids, each flow channel being defined between a respective pair of adjacent sheets; each flow channel in which a chemical reaction is to take place extending straight through the stack and containing a removable gas-permeable catalyst structure incorporating a metal substrate; and an inlet and an outlet for the first fluid; the first flow channels being oriented in a direction that is perpendicular to that of the second flow channels;

wherein between successive second flow channels in the stack the reactor defines at least three side-by-side first flow channels;

and the reactor incorporates flow diversion means such that the first fluid must flow through at least three first flow channels in succession, in flowing from the inlet to the outlet.

In one embodiment, the flow diversion means comprises headers attached to opposed surfaces of the stack. Alternatively or additionally the flow diversion means may comprise linking flow paths that providing communication between end portions of successive side-by-side first flow channels, the linking flow paths providing flow in a direction generally parallel to the orientation of the second flow channels. These linking flow paths may be defined by holes or apertures, or by means that define linking flow segments. Where communication between end portions of successive side-by-side first flow channels is provided by the linking flow paths, there is no need for there to be any flow through headers to link successive first flow channels. In every case the overall flow pattern is of a zigzag or serpentine flow which is at least partly counter-current or co-current relative to the flow in the second flow channels. This may improve heat transfer between the first and second gas flow channels.

The reactor may comprise a stack of flat plates with the first and second flow channels defined by grooves in the plates. Alternatively the flow channels may be defined by thin metal sheets that are castellated and stacked alternately with flat sheets; the edges of the flow channels may be defined by sealing strips. To ensure the required good thermal contact both the first and the second gas flow channels may be between 10 mm and 2 mm deep, preferably less than 6 mm deep, more preferably in the range 2 mm to 5 mm. The stack of plates forming the reactor module is bonded together for example by diffusion bonding, brazing, or hot isostatic pressing. The material of which the reactor is made will depend upon the operating temperature, and on the gases to which it is exposed. For example, in the case of a reactor for steam reforming, suitable metals are iron/nickel/chromium alloys for high-temperature use, such as Haynes HR-120 or Inconel 800HT (trade marks), or similar materials.

If the first flow channels are defined by grooves in respective plates, these grooves being separated by lands, then slots or holes may be defined through the lands near the end of each groove so as to define linking flow paths between adjacent grooves.

The catalyst structure preferably has a metal substrate to provide strength and to enhance thermal transfer within the catalyst structure by conduction so preventing hotspots. Typically the metal substrate would be covered with a ceramic coating into which active catalytic material is incorporated. Preferably the metal substrate for the catalyst structure is a steel alloy that forms an adherent surface coating of aluminium oxide when heated, for example an aluminium-bearing ferritic steel (eg Fecralloy™). When this metal is heated in air it forms an adherent oxide coating of alumina, which protects the alloy against further oxidation and against corrosion. Where the ceramic coating is of alumina, this appears to bond to the oxide coating on the surface. Preferably each catalyst structure is shaped so as to subdivide the flow channel into a multiplicity of parallel flow sub-channels, with catalytic material on surfaces within each such sub-channel. The substrate may be a foil, a wire mesh or a felt sheet, which may be corrugated, dimpled or pleated; the preferred substrate is a thin metal foil for example of thickness less than 100 μm.

Thus in one embodiment the catalyst structure incorporates a corrugated metal foil. The catalyst structure is not structural, that is to say it does not significantly contribute to the mechanical strength of the reactor, so that such a catalyst structure may be inserted into each flow channel, with a catalyst suited to the corresponding reaction. The catalyst structures are removable from the channels in the reactor, so they can be replaced if the catalyst becomes spent.

Reactors suitable for the steam/methane reforming reaction or for the Fischer-Tropsch synthesis may be constructed in accordance with the invention. Consequently a plant for processing natural gas to obtain longer chain hydrocarbons may incorporate a steam/methane reforming reactor of the invention, to react methane with steam to form synthesis gas, and also a Fischer-Tropsch reactor of the invention to generate longer-chain hydrocarbons. In the steam/methane reforming reactor both the first and the second gas flow channels are preferably less than 5 mm deep, more preferably less than 3 mm deep; in the case of the Fischer-Tropsch reactor the channels for the reaction are preferably less than 10 mm deep.

Reactors of this type provide short diffusion path lengths, so that the heat and mass transfer rates can be high, and so the rates of chemical reactions can be high. Such a reactor can therefore provide a high power density. In each case the flow directions are preferably at least partly co-current. In the case of a reactor for steam methane reforming it is desirable to have the peak temperature at the outlet from the reforming channels, and this is most readily achieved with co-current flow. With a Fischer-Tropsch reactor it is preferable to have the warmest coolant adjacent to the exit from the Fischer-Tropsch channels, to suppress wax deposition, so that again co-current flow is preferred.

Preferably the flow diversion means are such that the first fluid must flow through no more than ten first flow channels in succession, for example five flow channels in succession.

BRIEF DESCRIPTION OF THE DRAWINGS

The invention will now be further and more particularly described, by way of example only, and with reference to the accompanying drawings, in which.

The invention is of relevance to a chemical process for converting natural gas (primarily methane) to longer chain hydrocarbons. The first stage of this process involves steam reforming, that is to say mixing the natural gas with steam so it undergoes a reaction of the type:

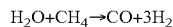
$$H_2O + CH_4 \rightarrow CO + 3H_2$$

This reaction is endothermic, and may be catalyzed by a rhodium or platinum/rhodium catalyst in a first gas flow channel. The heat required to cause this reaction may be provided by combustion of an inflammable gas such as methane or hydrogen, which is exothermic and may be catalyzed by a palladium catalyst in an adjacent second gas flow channel. In both cases the catalyst is preferably on a stabilized-alumina support which forms a coating typically less than 100 μm thick on the metallic substrate. The combustion reaction may take place at atmospheric pressure, but the reforming reaction may take place at between 4 and 5 atmospheres. The heat generated by the combustion would be conducted through the metal sheet separating the adjacent channels.

The gas mixture produced by the steam/methane reforming is then used to perform a Fischer-Tropsch synthesis to generate a longer chain hydrocarbon, that is to say:

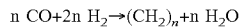
$$n\ CO + 2n\ H_2 \rightarrow (CH_2)_n + n\ H_2O$$

which is an exothermic reaction, occurring at an elevated temperature, typically between 190° C. and 280° C., for example 210° C., and an elevated pressure typically between 1.8 MPa and 2.1 MPa (absolute values), for example 2.0 MPa, in the presence of a catalyst such as iron, cobalt or fused magnetite, with a potassium promoter. The preferred catalyst for the Fischer-Tropsch synthesis comprises a coating of gamma-alumina of specific surface area 140–230 m²/g with about 10–40% cobalt (by weight compared to the alumina), and with a promoter such as ruthenium, platinum or gadolinium which is less than 10% the weight of the cobalt.

Figure 1:
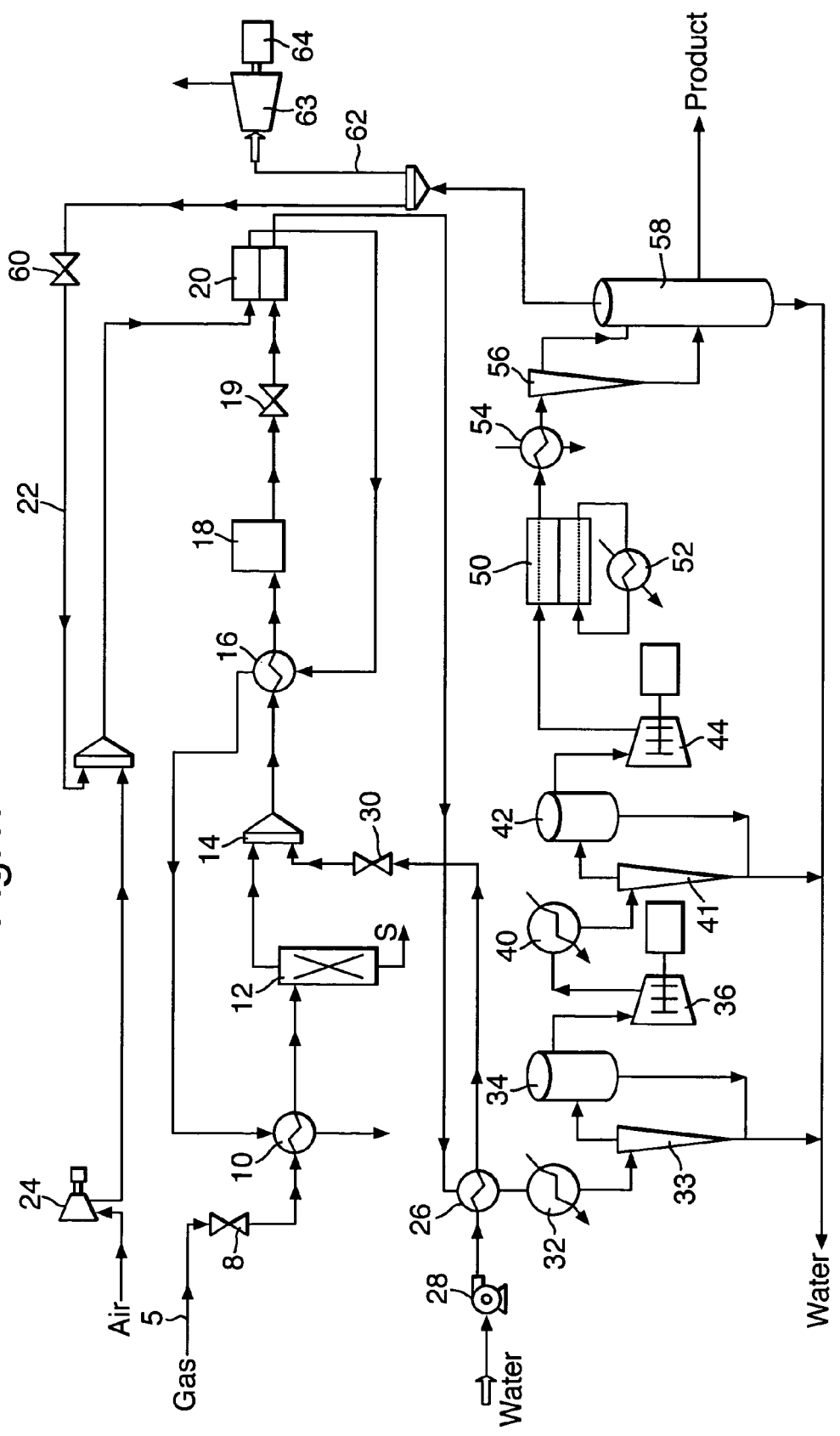
FIG. 1 shows a flow diagram of a chemical plant incorporating reactors of the invention.

Referring now to FIG. 1, the overall chemical process is shown as a flow diagram in which the components of the plant are shown. The natural gas feed 5 consists primarily of methane with, in this example, a percentage of higher hydrocarbons $C_2$ to $C_{11}$. Typically these higher hydrocarbons are present at up to 10% v/v depending on the source of natural gas. The gas feed 5 may for example be at a pressure of 1.0 MPa (10 atmospheres).

The gas pressure is regulated by a valve 8 to 0.6 MPa and then the gas 5 is pre-heated to about 400° C. in a heat exchanger 10 using the hot exhaust gas from catalytic combustion, and is then fed to a solid bed de-sulphurising system 12 that reduces the sulphur content in the gas to 0.1 ppm or less. The de-sulphurised natural gas 5 is then mixed with steam, for example in a fluidic vortex mixer 14. The gas/steam mixture is heated in a heat exchanger 16 using the hot exhaust gas from catalytic combustion so that the gas mixture is at a temperature of 500° C. The mixture enters an adiabatic fixed bed pre-reformer 18 where it contacts a nickel or a platinum/rhodium based methanation catalyst. The higher hydrocarbons react with the steam to form methane and CO.

The gas exits the pre-reformer 18 at a lower temperature typically 450° C. The pressure is then let down by a valve 19 to 0.45 MPa (absolute pressure) before entering a reformer 20. The reformer 20 is a compact catalytic reactor of the type described above, made from a stack of plates which define flow paths for endothermic and exothermic reactions which are in good thermal contact, and which contain appropriate catalysts on corrugated metal foil supports. The reformer channels in the reformer 20 contain a platinum/rhodium catalyst, and the steam and methane react to form carbon monoxide and hydrogen. The temperature in the reformer increases from 450° C. at the inlet to about 800–850° C. at the outlet. The flow rates of steam and gas supplied to the mixer 14 are such that the steam:carbon molar ratio fed to the reformer 20 is between 1.2–1.6 and preferably between 1.3 and 1.5. Depending on the higher hydrocarbon content of the gas 5, the steam to carbon ratio at the inlet to the pre-reformer 18 will therefore need to be higher than this.

The heat for the endothermic reactions in the reforming reactor 20 is provided by the catalytic combustion of a mixture of short chain hydrocarbons and hydrogen which is the tail gas 22 from the Fischer-Tropsch synthesis; this tail gas 22 is combined with a flow of air provided by an air blower 24. The combustion takes place over a palladium/platinum catalyst within adjacent flow channels within the reforming reactor 20. The combustion gas path is co-current relative to the reformer gas path. The catalyst may include gamma-alumina as a support, coated with a palladium/platinum mixture 3:1, which is an effective catalyst over a wide temperature range. The combustible gas mixture may be supplied in stages along the reactor 20 to ensure combustion occurs throughout the length of the combustion channels.

A mixture of carbon monoxide and hydrogen at above 800° C. emerges from the reformer 20 and is quenched to below 400° C. by passing it through a steam-raising heat exchanger 26. Water is supplied to this heat exchanger 26 by a pump 28, and the steam for the reforming process is hence supplied through a control valve 30 to the mixer 14. The gas mixture is further cooled in a heat exchanger 32 with cooling water to about 60° C., so the excess water condenses and is separated by passage through a cyclone 33 and a separator vessel 34. The gas mixture is then compressed by a compressor 36 to about 2.5 times the pressure, and is again cooled by a heat exchanger 40 before passing through a second cyclone 41 and a separator vessel 42 to remove any water that condenses. The separated water is re-cycled back to the steam raising circuit. The gas is then compressed to 20 atmospheres in a second compressor 44.

The stream of high pressure carbon monoxide and hydrogen is then fed to a catalytic Fischer-Tropsch reactor 50, this again being a compact catalytic reactor formed from a stack of plates as described above; the reactant mixture flows through one set of channels, while a coolant flows through the other set.

The reaction products from the Fischer-Tropsch synthesis, predominantly water and hydrocarbons such as paraffins, are cooled to condense the liquids by passage through a heat exchanger 54 and a cyclone separator 56 followed by a separating chamber 58 in which the three phases water, hydrocarbons and tail gases separate, and the hydrocarbon product is stabilized at atmospheric pressure. The hydrocarbons that remain in the gas phase and excess hydrogen gas (the Fischer-Tropsch tail gases 22) are collected and split. A proportion passes through a pressure reduction valve 60 to provide the fuel for the catalytic combustion process in the reformer 20 (as described above). The remaining tail gases 62 are fed to a gas turbine 63 which drives an electrical power generator 64.

The gas turbine 64 generates all the power for the plant and has the capacity to export a surplus. The major plant electrical power needs are the compressors 36 and 44, and the pumps 24 and 28; electricity may also be used to operate a vacuum distillation unit to provide process water for steam generation and to provide drinking water.

It will be appreciated, from the equations discussed above, that the steam reforming stage forms more hydrogen than is required for the Fischer-Tropsch synthesis. Consequently the tail gases 22 contain a significant quantity of hydrogen, as well as the lower alkanes (say C1 to C5). However, the tail gases 22 also contain a significant quantity of carbon monoxide. They can therefore be subjected to a second Fischer-Tropsch synthesis by passage through a second such reactor (not shown), so that the overall carbon monoxide conversion is increased, and somewhat more of the desired product is obtained.

Figure 2:
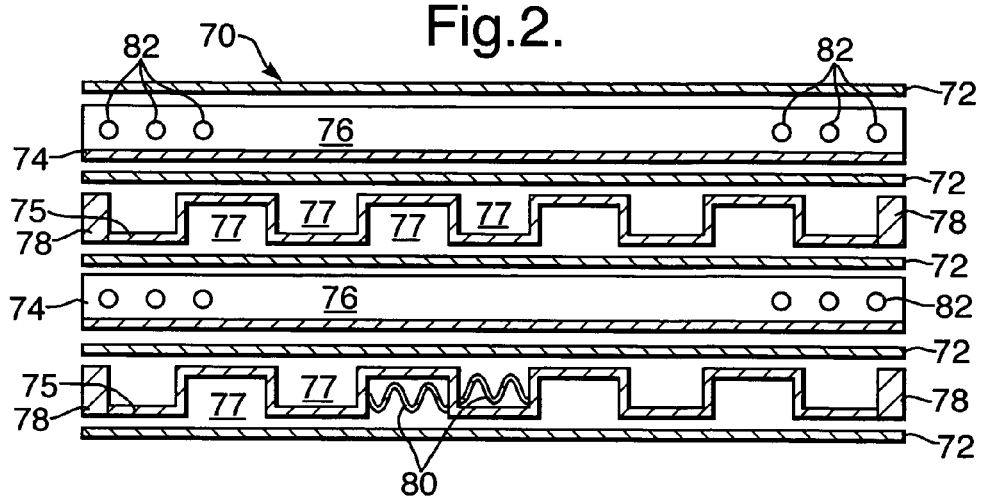
FIG. 2 shows a sectional view of a reactor suitable for steam/methane reforming.
Figure 3:
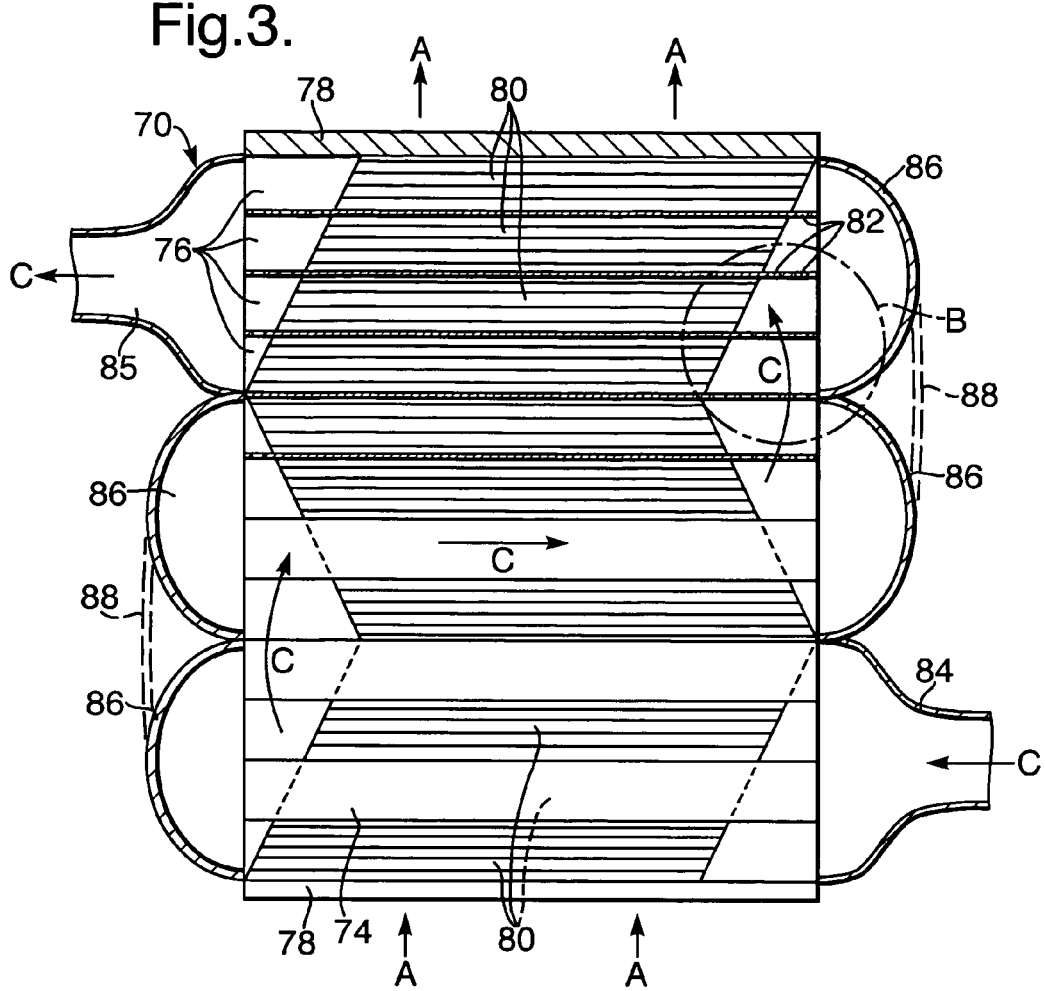
FIG. 3 shows a plan view of part of the reactor of FIG. 2, partly shown broken away.

Referring now to FIGS. 2 and 3 there is shown a reactor 70 suitable for use as the steam reforming reactor 20. Referring firstly to FIG. 2 which shows parts of the reactor 70 in section and with the components separated for clarity, the reactor 70 is made from a stack of plates that are rectangular in plan view, each plate being 1 mm thick and of stainless steel (for example 316L or Inconel 800HT). Flat plates 72 are arranged alternately with castellated plates 74, 75 in which the castellations are such as to define straight-through channels 76, 77 from one side of the plate to the other. The castellated plates 74 and 75 are arranged in the stack alternately, so the channels 76, 77 are oriented in orthogonal directions in alternate castellated plates 74, 75. The height of the castellations (typically in the range 2–10 mm) is 4 mm in this example, and 4 mm thick solid edge strips 78 are provided along the sides.

The stack is assembled as described above, and bonded together by high-temperature brazing; corrugated metal foil catalyst carriers 80 (only two of which are shown) are then inserted into the channels, carrying catalysts for the two different reactions. Appropriate headers can then be attached to the outside of the stack. The metal foil is preferably of an aluminium-containing steel alloy such as Fecralloy.

Figure 3A:
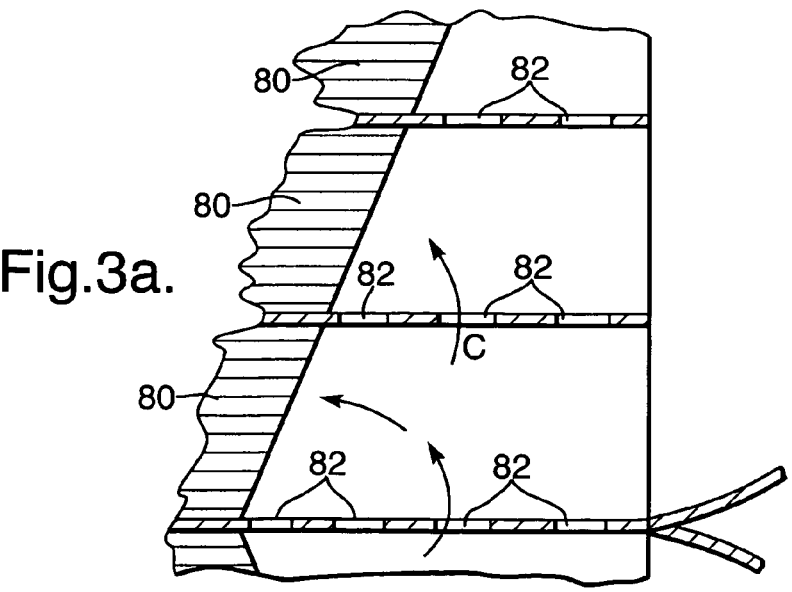
FIG. 3a shows, to a larger scale, part of the reactor of FIG. 2.

Referring now to FIG. 3, which shows a sectional view through the reactor 70 showing one such castellated plate 74 in plan, and partly cut away to show the castellations in section, the steam/methane reforming reaction takes place in the channels defined by this plate 74. The combustion reaction takes place in the channels 77 in the alternate plates 75 (not shown in FIG. 3) between appropriate headers (not shown), the combustion flow direction being indicated by the arrows A. In each channel 76 is a catalyst carrying foil 80 of parallelogram shape in plan, and these are inserted to different positions in the channels 76 so that the ends of the foils align with each other. The ends of the foils 80 thus define a zigzag. The end portions of the walls separating adjacent channels 76 are perforated by holes 82, as shown more clearly in FIG. 3a (which shows an expanded view of the part of FIG. 3 within the circle B) so that gases can flow between adjacent channels 76 in the end regions in which there is no foil 80. There are progressively more holes 82 the closer to the centre of the triangle formed by these end regions, so that the gas flow area per unit length of exposed wall is a constant.

Part-cylindrical headers are attached along the sides of the stack to permit access to the channels 76; there is an inlet header 84 communicating with four adjacent channels 76 at one end of the reactor 70, an outlet header 85 communicating with four adjacent channels 76 at the diagonally opposite end of the reactor 70, and blank headers 86 covering the others parts of the stack sides. The flow path for the steam/methane mixture is indicated by the arrows C, entering through the inlet header 84, flowing along the four adjacent channels 76 from right to left (as shown), then flowing through holes 80 to the next set of four channels 76; then flowing through those channels 76 from left to right (as shown, and so through holes 80 into the last set of channels 76; and through that last set of channels 76 to the outlet header 85. Thus the steam/methane mixture as it undergoes reaction follows a path which, overall, is co-current relative to the combustion gas flow A, although each individual flow section 76 is transverse.

It will be appreciated that there is no need for any gas flow through the blank headers 86, so that these may be of a different shape and size to that shown. Indeed these headers 86 may be replaced by blank plates, or by a larger number of blank headers of a smaller radius of curvature. These headers are required to provide access to the channels 76 containing catalyst-carrying foils 80, so that the catalyst can be replaced when it is spent. In a further modification, each foil 80 has a square end, the foils 80 being inserted so the ends form a stepped zigzag (for example the ends of such square-ended foils may be in the positions of the mid-points of the sloping ends shown in FIG. 3), so there is again a gap between the end of each foil 80 and the end of the corresponding channel 76, so flow can occur through the holes 82 between adjacent channels 76. As another alternative, each individual foil 80 might have a stepped sloping end.

In another alternative reactor the pairs of adjacent headers 86 are replaced by larger headers 88 that are twice the width (indicated by broken lines in FIG. 3), and in this case there is no requirement for the holes 82, and the catalyst foils 80 can extend the entire length of the channels 76. In this case the headers 88 bring about the change of direction of the gases, so that again the steam/methane mixture follows a path which, overall, is co-current relative to the combustion gas flow A.

Figure 4:
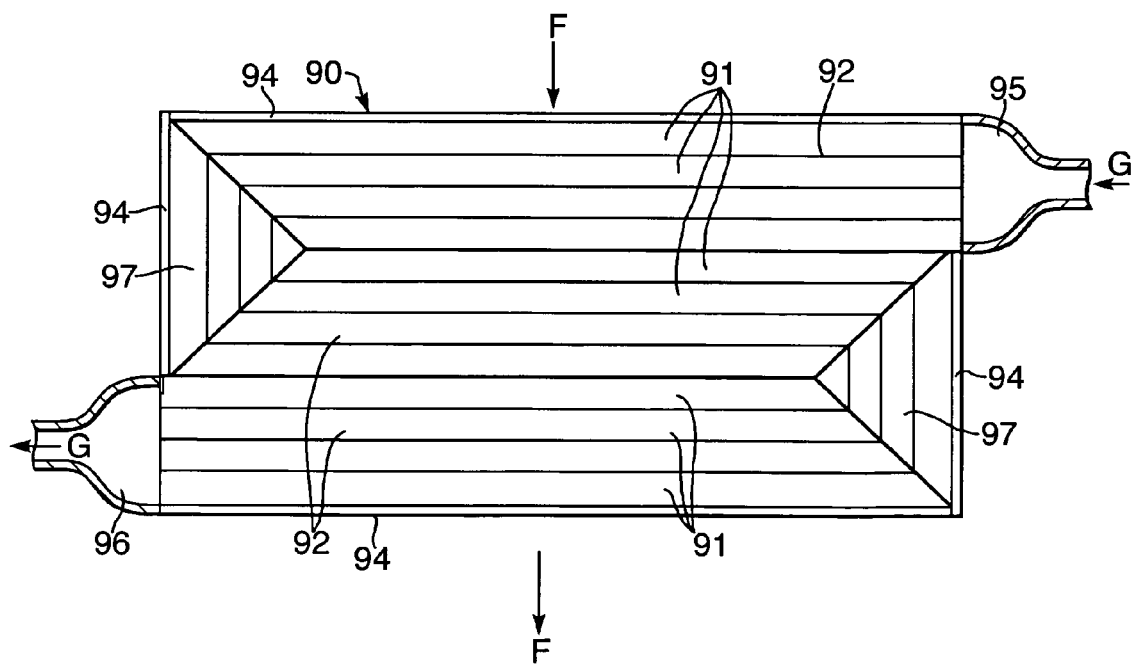
FIG. 4 shows a diagrammatic plan view of a reactor suitable for Fischer-Tropsch synthesis.

Considering now the Fischer-Tropsch reactor 50, no catalysts are required in the coolant channels, so there is no need for access to those channels. Referring now to FIG. 4, a reactor 90 suitable for use as the reactor 50 is constructed in a similar way to the reactor 70 of FIGS. 2–3. It comprises a stack of flat plates alternating with castellated plates, with the orientations of the channels defined by the castellations being orthogonal in alternate castellated plates, as described above in relation to FIG. 2. The channels (not shown in FIG. 4) for the Fischer-Tropsch reaction contain catalyst-carrying foils, and extend straight through the reactor 90 between appropriate headers (not shown), the flow along these channels being indicated by the arrows F. The coolant channels are constructed from a long strip of 1 mm thick sheet formed into castellations running along its length. As shown, the castellated strip is cut into lengths and these are laid side-by-side to define flow paths 91 transverse to the direction of the arrows F, three such lengths 92 of castellated strip forming a rectangle, with edge strips 94 along the edges, so as to provide paths between an inlet port 95 and an outlet port 96. The ends of the castellated strip next to the inlet port 95 and the outlet port 96 are cut square, while the other ends are cut at 45°, and triangular pieces 97 of the castellated strip provide links between the flow paths 92.

In a modification, additional sealing strips like the edge strips 94 are also provided between side-by-side edges of the lengths 92 of castellated strip. As with the reactor 70, the stack is assembled as described above, and then bonded together for example by high-temperature brazing.

Heat transfer into and across the coolant channels 91 may be enhanced by inserting corrugated foils (not shown), similar to the foils 80 of the reactor 70 but not incorporating a catalyst, and not being removable. Such inserted foils may be perforated. In a modification, the castellations defining the flow channels 91 might not follow straight paths along the length of the strip, but might follow a sinuous or zigzag path, and might also be perforated. It will also be appreciated that the reactor 90 allows the coolant to pass three times across the width of the Fischer-Tropsch channels, in passing between the inlet 95 and the outlet 96; alternatively the coolant might pass more than three times.

It will also be appreciated that in both the reactors 70 and 90, one or more of the channels containing catalysts might be defined by grooves machined into thick steel plates instead of being formed by castellations in a thin plate.

I claim:

1. A compact catalytic reactor comprising a plurality of metal sheets arranged as a stack and bonded together, the stack defining a plurality of first flow channels for a first fluid alternating in the stack with a plurality of second flow channels for a second fluid so as to ensure good thermal contact between the first and the second fluids, each flow channel being defined between a respective pair of adjacent sheets; each flow channel in which a chemical reaction is to take place extending straight through the stack and containing a removable gas-permeable catalyst structure incorporating a metal substrate; and an inlet and an outlet for the first fluid; the first flow channels being oriented in a direction that is perpendicular to that of the second flow channels;

characterised in that between successive second flow channels in the stack the reactor defines at least three first flow paths each defined by a plurality of side-by-side first flow channels;

and the reactor incorporates flow diversion means such that the first fluid must flow through at least three first flow paths in succession, in flowing from the inlet to the outlet; the flow diversion means comprising linking means within the stack that allow fluid flow between end portions of successive flow paths in a direction generally transverse to that of the first flow channels, so the flows in successive flow paths are in opposite directions.

2. A reactor as claimed in claim 1 wherein the flow diversion means also comprises headers attached to opposed surfaces of the stack.

3. A reactor as claimed in claim 1 wherein the linking means are defined by holes or apertures.

4. A reactor as claimed in claim 1 wherein the linking means define linking flow segments.

5. A reactor as claimed in claim 1 wherein the straight-through channels are defined by grooves machined in a thick plate.

6. A reactor as claimed in claim 1 wherein the straight-through channels are formed by castellations extending along a thin plate.

7. A reactor as claimed in claim 1 wherein each catalyst structure is shaped so as to subdivide the flow channel into a multiplicity of parallel flow subchannels, with catalytic material on surfaces within each such sub-channel.

8. A plant for processing a gas stream comprising methane to obtain longer chain hydrocarbons, the plant comprising a first reactor for steam/methane reforming and a second reactor for Fischer-Tropsch synthesis, in which each reactor comprises a reactor as claimed in claim 1.

9. A plant for processing a gas stream comprising methane to obtain longer chain hydrocarbons, the plant comprising a first reactor for steam/methane reforming and a second reactor for Fischer-Tropsch synthesis, in which each reactor comprises a reactor as claimed in claim 6.

* * * * *